(12) United States Patent
Xu et al.

(10) Patent No.: US 9,559,833 B1
(45) Date of Patent: Jan. 31, 2017

(54) FREQUENCY SYNCHRONIZATION FOR A NEAR FIELD COMMUNICATION (NFC) DEVICE

(71) Applicant: Broadcom Corporation, Irvine, CA (US)

(72) Inventors: Shengyang Xu, Irvine, CA (US); Dong-U Lee, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/920,990

(22) Filed: Oct. 23, 2015

Related U.S. Application Data

(60) Provisional application No. 62/221,429, filed on Sep. 21, 2015.

(51) Int. Cl.
*H03D 3/24* (2006.01)
*H04L 7/00* (2006.01)
*H04W 4/00* (2009.01)
*H04W 56/00* (2009.01)

(52) U.S. Cl.
CPC ............ *H04L 7/0037* (2013.01); *H04W 4/008* (2013.01); *H04W 56/0035* (2013.01)

(58) Field of Classification Search
CPC ... H04B 5/0031; H04B 5/0075; H05K 5/0086; H05K 5/0217
USPC ................. 375/327, 259, 268, 300; 455/41.1
See application file for complete search history.

(56) References Cited

U.S. PATENT DOCUMENTS

| | | | |
|---|---|---|---|
| 9,301,337 B2 * | 3/2016 | Brown ..................... | H04B 5/02 |
| 2014/0378053 A1 * | 12/2014 | Clarke ................. | H04B 5/0031 |
| | | | 455/41.1 |
| 2015/0105016 A1 * | 4/2015 | Lefley .................. | H04B 5/0075 |
| | | | 455/41.1 |

* cited by examiner

*Primary Examiner* — Khai Tran
(74) *Attorney, Agent, or Firm* — Sterne, Kessler, Goldstein & Fox PLLC (57) ABSTRACT

A first near field communication (NFC) device is disclosed that synchronizes a first carrier wave of the first NFC device to a second carrier wave of a second NFC device. The first NFC device observes a magnetic field having the first carrier wave modulated with information corresponding to the first NFC device and the second carrier wave modulated with information corresponding to the second NFC device. The first NFC device isolates the information corresponding to the second NFC device from the combined sequence of information to determine a frequency error and/or a phase error between the carrier waves. Finally, the first NFC device adjusts the frequency of the first carrier wave in accordance with the first frequency error and/or the phase of the first carrier wave in accordance with the first phase error to synchronize the carrier waves.

19 Claims, 4 Drawing Sheets

FREQUENCY SYNCHRONIZATION FOR A NEAR FIELD COMMUNICATION (NFC) DEVICE

CROSS-REFERENCE TO RELATED APPLICATIONS

The present application claims the benefit of U.S. Provisional Patent Appl. No. 62/221,429, filed Sep. 21, 2015, which is incorporated herein by reference in its entirety.

BACKGROUND

Field of Disclosure

The present disclosure generally relates to near field communication (NFC) devices and including synchronizing carrier waves to the NFC devices to each other.

Related Art

The continued improvement of semiconductor fabrication processes has allowed manufacturers and designers to create a smaller and a more powerful electronic device. This smaller and more powerful electronic device is being integrated with near field communication (NFC) technology to facilitate the use of the electronic device in conducting daily transactions. Often times, the smaller and more powerful electronic device is integrated with a NFC device to provide the NFC technology. For example, instead of carrying numerous credit cards, the credit information provided by these credit cards can be loaded and stored onto a first NFC device to be used as needed. The first NFC device is simply tapped to a second NFC device, such as credit card terminal, to relay the credit information to complete a transaction. As another example, a first NFC device, such as a ticket writing system to provide an example, can simply write ticket fare information onto a second NFC device instead of providing a paper ticket to a passenger. The passenger simply taps the second NFC device to a third NFC device to ride the bus or the train without using a traditional the paper ticket.

NFC devices can operate in an active load modulation (ALM) mode of operation. When operating in the ALM mode of operation, an NFC reader device generates a first carrier wave and inductively couples the first carrier wave onto an NFC tag device via a first magnetic field. Optionally, the first carrier wave can be modulated with information to communicate the information to the NFC tag device. Similarly, the NFC tag device generates a second carrier wave and inductively couples the second carrier wave onto the NFC reader device via a second magnetic field when operating in the ALM mode of operation. Optionally, the second carrier wave can be modulated with a response to information to communicate the response to the NFC reader device.

Embodiments of the disclosure are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE DISCLOSURE

Overview

A first near field communication (NFC) device is disclosed that synchronizes a first carrier wave of the first NFC device to a second carrier wave of a second NFC device. The first NFC device observes a magnetic field having the first carrier wave modulated with information corresponding to the first NFC device and the second carrier wave modulated with information corresponding to the second NFC device. The first NFC device isolates the information corresponding to the second NFC device from the combined sequence of information to determine a frequency error and/or a phase error between the carrier waves. Finally, the first NFC device adjusts the frequency of the first carrier wave in accordance with the first frequency error and/or the phase of the first carrier wave in accordance with the first phase error to synchronize the carrier waves.

An Exemplary Near Field Communications (NFC) Environment

Figure 1:
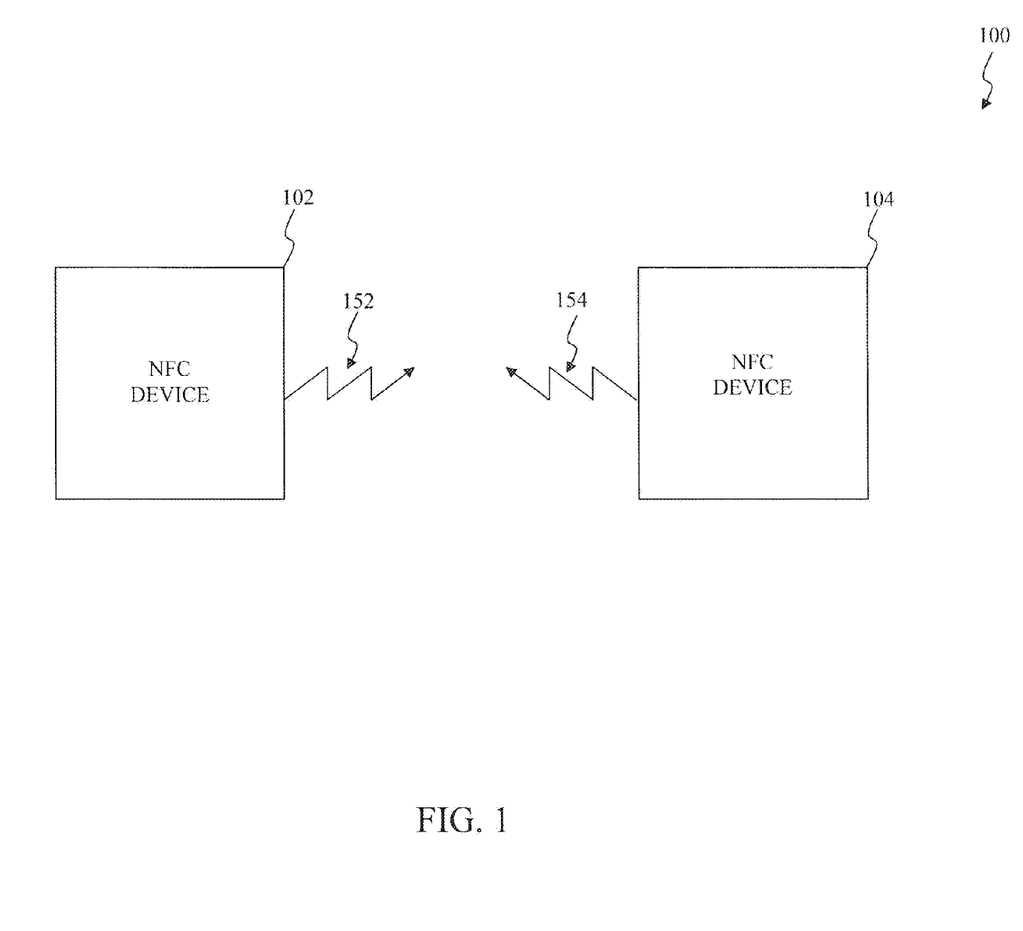
FIG. 1 illustrates a block diagram of a near field communication (NFC) environment according to an exemplary embodiment of the disclosure.

FIG. 1 illustrates a block diagram of an NFC environment according to an exemplary embodiment of the disclosure. An NFC environment 100 provides wireless communication of information, such as one or more commands and/or data, among a first NFC device 102 and a second NFC device 104 that are sufficiently proximate to each other.

The first NFC device 102 and/or the second NFC device 104 interact with each other to exchange information, such as one or more commands and/or data. As illustrated in FIG. 1, the first NFC device 102 and/or the second NFC device 104 can operate in an active load modulation (ALM) mode of operation. In the ALM mode of operation, the first NFC device 102 modulates its corresponding information onto a first carrier wave, referred to as a modulated information communication, and generates a first magnetic field by applying the modulated information communication to a first antenna to provide a first information communication 152. The first NFC device 102 continues to provide the first carrier wave via the first magnetic field after transmission of its corresponding information to the second NFC device 104.

The first NFC device 102 is sufficiently proximate to the second NFC device 104 such that the first information communication 152 is inductively coupled onto a second antenna of the second NFC device 104. The second NFC device 104 demodulates the first information communication 152 to recover the information. The second NFC device 104 can respond to the information by modulating its corresponding information onto a second carrier wave and generating a second magnetic field by applying this modulated information communication to the second antenna to provide a second modulated information communication 154 in the ALM mode of operation. The second NFC device 104 continues to provide the second carrier wave via the second magnetic field after transmission of its corresponding information to the first NFC device 102. In an exemplary embodiment, the first NFC device 102 and/or the second NFC device communicate their corresponding information using a bipolar modulation scheme, such as binary phase-shift keying (BPSK) to provide an example, which switches between a positive logical value, such as a logical positive one to provide an example, and a negative logical value, such as logical negative one to provide an example, to modulate their corresponding information onto the first carrier wave and the second carrier wave, respectively.

Often times, the first NFC device 102 and the second NFC device 104 simultaneously provide the first carrier wave via the first magnetic field and the second carrier wave via the second magnetic field, respectively, in the ALM mode of operation. As a result, the first magnetic field and the second magnetic field can interfere with each other. This interference can be constructive or destructive. When the first carrier wave and the second carrier wave are synchronized in frequency and/or phase, the first magnetic field and the second magnetic field constructively interfere with each other. The first magnetic field and the second magnetic field combine to form a combined magnetic field with a greater magnitude than the first magnetic field and the second magnetic field. However, when the first carrier wave and the second carrier wave are not synchronized in frequency and/or phase, the first magnetic field and the second magnetic field destructively interfere with each other. The first magnetic field and the second magnetic field subtract to form a combined magnetic field with a lesser magnitude than the first magnetic field and the second magnetic field.

The first NFC device 102 and/or the second NFC device 104 can synchronize the first carrier wave and the second carrier wave when the first carrier wave and/or the second carrier wave are modulated with information. To synchronize the first carrier wave and the second carrier wave, the first NFC device 102 and/or the second NFC device 104 observe the combined magnetic field to recover a combined electrical signal having the first carrier wave modulated with information corresponding to the first NFC device 102 and the second carrier wave modulated with information corresponding to the second NFC device 104. Thereafter, the first NFC device 102 and/or the second NFC device recovers a combined sequence of information including the information corresponding to the first NFC device 102 and the information corresponding to the second NFC device 104.

Next, the first NFC device 102 and/or the second NFC device 104 isolate the information corresponding to the second NFC device 104 and the information corresponding to the first NFC device 102, respectively, from the combined sequence of information. In an exemplary embodiment, the first NFC device 102 and/or the second NFC device 104 detect one or more first integration windows and one or more second integration windows, respectively. Thereafter, the first NFC device 102 and/or the second NFC device 104 perform integration procedures on the combined sequence of information during the first integration window to isolate the information corresponding to the second NFC device 104 and during the second integration window to isolate the information corresponding to the first NFC device 102, respectively. The first NFC device 102 and/or the second NFC device 104 detect the one or more first integration windows and the one or more second integration windows, respectively, using a pattern matching procedure. This pattern matching procedure matches bits within the combined sequence of information to each other to detect one or more sequences of bits from among the combined sequence of information that when integrated over effectively cancels the information corresponding to the first NFC device 102 or the information corresponding to the second NFC device 104 from the combined sequence of information.

Subsequently, the first NFC device 102 determines a first frequency error between a frequency of the first carrier wave and a frequency of the second carrier wave and/or a first phase error between a phase of the first carrier wave and a phase of the second carrier wave. Similarly, the second NFC device 104 determines a second frequency error between the frequency of the second carrier wave and the frequency of the first carrier wave and/or a second phase error between the phase of the second carrier wave and the phase of the first carrier wave. In an exemplary embodiment, the first NFC device 102 and the second NFC device 104 determine the first frequency error and the first phase error by observing the phase of the information corresponding to the second NFC device 104 and the second frequency error and the second phase error by observing the information corresponding to the first NFC device 102, respectively.

Finally, the first NFC device 102 adjusts the frequency of the first carrier wave in accordance with the first frequency error and/or the phase of the first carrier wave in accordance with the first phase error to synchronize the first carrier wave and the second carrier wave. Similarly, the second NFC device 104 adjusts the frequency of the second carrier wave in accordance with the second frequency error and/or the phase of the second carrier wave in accordance with the second phase error to synchronize the second carrier wave and the first carrier wave.

An Exemplary Near Field Communications (NFC) Device

Figure 2:
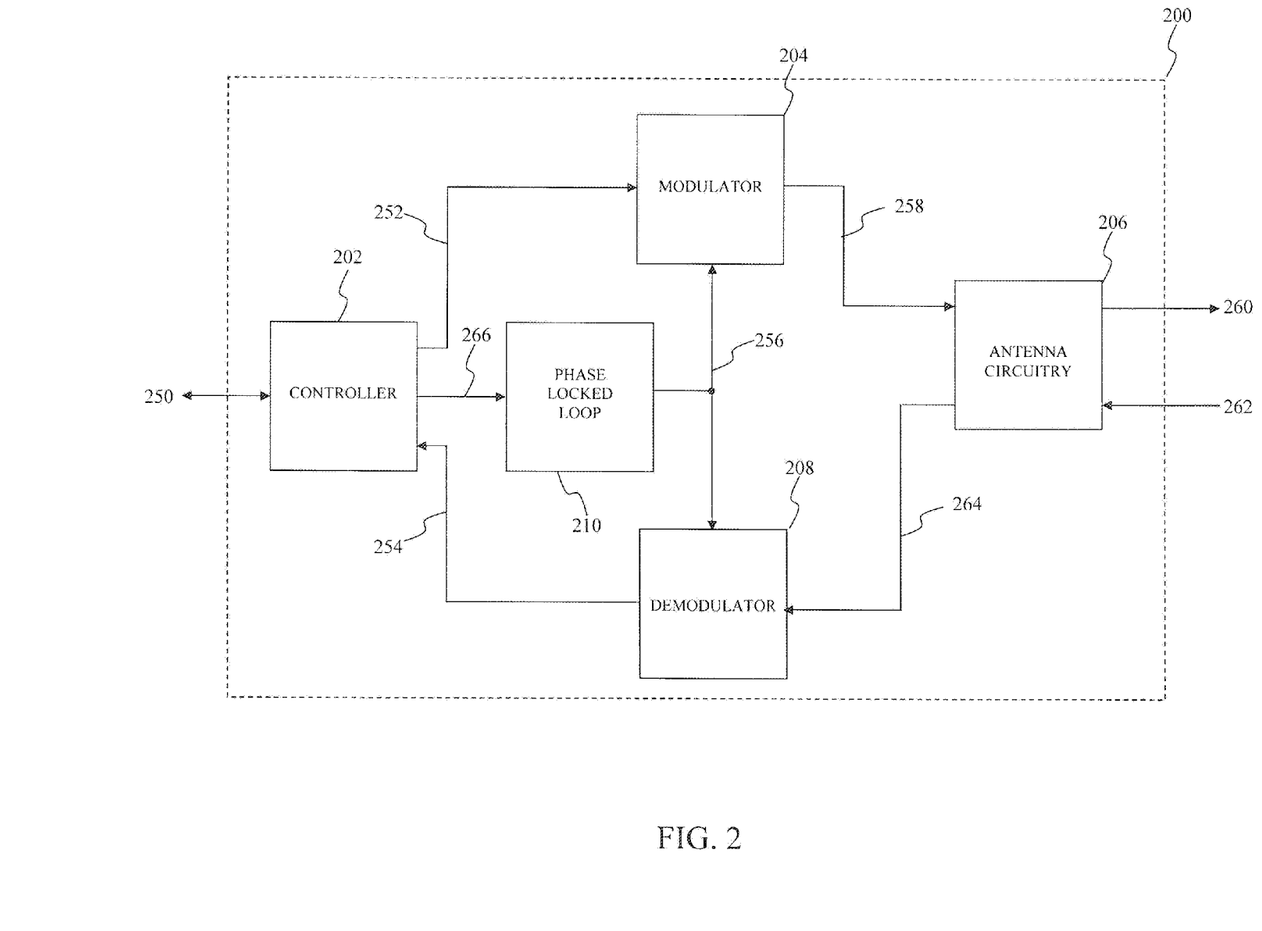
FIG. 2 illustrates a block diagram of an exemplary NFC device within the NFC environment according to an exemplary embodiment of the disclosure.

FIG. 2 illustrates a block diagram of an exemplary NFC device within the NFC environment according to an exemplary embodiment of the disclosure. A first NFC device 200 can be implemented as a standalone or a discrete device or can be incorporated within or coupled to another electrical device or host device such as a mobile telephone, a portable computing device, another computing device such as a personal, a laptop, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the disclosure. When incorporated within or coupled to the other electrical device or host device, the first NFC device 200 and the other electrical device or host device can be referred to as being NFC-enabled devices. As illustrated in FIG. 2, the first NFC device 200 includes a controller 202, a modulator 204, antenna circuitry 206, a demodulator 208, and a phase locked loop (PLL) 210. The first NFC device 200 can represent an exemplary embodiment of the first NFC device 102 and/or the second NFC device 104.

The controller 202 controls overall operation and/or configuration of the first NFC device 200. The controller 202 provides information 250 to and/or receives the information 250 from one or more data storage devices such as one or more contactless transponders, one or more contactless tags, one or more contactless smartcards, any other machine-readable mediums that will be apparent to those skilled in the relevant art(s) without departing from the spirit and scope of the disclosure, or any combination thereof. The other machine-readable medium can include, but is not limited to, read only memory (ROM), random access memory (RAM), magnetic disk storage media, optical storage media, and/or flash memory devices to provide some examples. The controller module can further provide the information 250 to and/or receive the information 250 from the other electrical devices or the host devices coupled to the first NFC device 200.

Additionally, the controller 202 can format the information 250 into information frames and can perform error encoding, such as cyclic redundancy check (CRC) to provide an example, on the information frames to provide transmission information 252 for transmission to a second NFC device. The information frames can include frame delimiters to indicate a start and/or an end of each of the information frames. Similarly, the controller 202 can de-frame recovered information frames of a recovered sequence of information 254 received from the second NFC device and can perform error decoding, such as cyclic redundancy check (CRC) to provide an example, on the recovered information frames to provide the information 250. The de-framing can include removing frame delimiters to indicate a start and/or an end of each of the recovered information frames.

The modulator 204 provides a first carrier wave 256 as a transmission signal 258 in the ALM mode of operation. The modulator 204 can also modulate the transmission information 252 onto the first carrier wave 256 using any suitable analog or digital modulation technique to provide the transmission signal 258 in the ALM mode of operation. Although the first NFC device 200 is described as operating in ALM mode of operation, those skilled in the relevant art(s) will recognize the first NFC device 200 can also be configured to operate in the PLM mode of operation without departing from the spirit and scope of the present disclosure. The suitable analog or digital modulation technique can include a bipolar modulation scheme, such as non-return-to-zero (NRZ), enhanced-non-return-to-zero-level (E-NRZ-L), non-return to zero, inverted (NRZI), or binary phase-shift keying (BPSK) to provide some examples. Generally, the bipolar modulation scheme can include any suitable modulation technique that modulates information onto a carrier wave to provide a modulated information signal that switches between a positive logical value and a negative logical value in accordance with the information. For example, the bipolar modulation scheme modulates the transmission information 252 onto the first carrier wave 256 to provide the transmission signal 258 that switches between the positive logical value and the negative logical value in accordance with the transmission information 252.

The antenna circuitry 206 applies the transmission signal 258 to an inductive coupling element, such as a resonant tuned circuit to provide an example, to generate a magnetic field to provide a transmitted information communication 260. Additionally, the antenna circuitry 206 observes the magnetic field. The magnetic field can include the transmitted information communication 260 and/or a received communication signal 262 from the second NFC device. Typically, the received communication signal 262 includes the second carrier wave of the second NFC device which can be modulated with information of the second NFC device. For example, the second NFC device can respond to the transmission information 252 by modulating the second carrier wave with its corresponding information when the second NFC device is likewise operating in the ALM mode of operation. The antenna circuitry 206 converts the observed magnetic field into an electrical signal to provide a recovered communication signal 264. The recovered communication signal 264 can include the first carrier wave 256 which can be modulated with the transmission information 252 and/or the second carrier wave of the second NFC device which can likewise be modulated with information of the second NFC device.

The demodulator 208 demodulates the recovered communication signal 264 using the first carrier wave 256 in accordance with the suitable analog or digital modulation technique to provide the recovered sequence of information 254. Ideally, a frequency and/or a phase of the first carrier wave 256 is synchronized to a frequency and/or a phase of the second carrier wave of the second NFC device. However, in some situations, the frequency and/or the phase of the first carrier wave 256 can differ from the frequency and/or the phase of the second carrier wave of the second NFC device. When the frequency and/or the phase of the first carrier wave 256 differs from the frequency and/or the phase of the second carrier wave of the second NFC device, in-phase components of the recovered sequence of information 254 can couple onto quadrature phase components of the recovered sequence of information 254 and/or quadrature components of the recovered sequence of information 254 can couple onto in-phase phase components of the recovered sequence of information 254 during demodulation causing distortion of the recovered sequence of information 254.

Referring back to the controller 202, the controller 202 provides an error control signal 266 to cause the PLL 210 to adjust the frequency and/or the phase of the first carrier wave 256 to synchronize the first carrier wave 256 to the second carrier wave of the second NFC device. To synchronize the first carrier wave 256 and the second carrier wave, the controller 202 isolates information modulated onto the second carrier wave of the second NFC device from the recovered sequence of information 254. In an exemplary embodiment, the controller 202 performs an integration procedure on the recovered sequence of information 254 over one or more integration window to isolate the information modulated onto the second carrier wave of the second NFC device from the recovered sequence of information 254. The controller 202 detects the one or more integration windows using a pattern matching procedure. This pattern matching procedure matches bits within the recovered sequence of information 254 to each other to detect one or more sequences of bits from among the recovered sequence of information 254 that when integrated over effectively cancels the transmission information 252 from the recovered sequence of information 254. The one or more integration windows represent a duration in time of the recovered sequence of information 254 having an approximate equal number of logical ones and logical zeros, for example an approximate equal number of positive logical values and negative logical values when using the bipolar modulation scheme. The recovered sequence of information 254 has a substantially fixed common mode component, such as approximately zero to provide an example, over the one or more integration windows. This substantially fixed common mode component allows the transmission information 252 to be cancelled from the recovered sequence of information 254 by integrating the recovered sequence of information 254 over the one or more integration windows leaving the information modulated onto the second carrier wave of the second NFC device.

Next, the controller 202 measures one or more characteristics, such as a phase and/or a frequency, of the information modulated onto the second carrier wave to determine a frequency error between the frequency of the first carrier wave 256 and the frequency of the second carrier wave of the second NFC device and/or the phase error between the phase of the first carrier wave 256 and the phase of the second carrier wave of the second NFC device. The controller 202 provides the frequency error and/or the phase error as the error control signal 266 to cause the PLL 210 to adjust the frequency of and/or the phase of the first carrier wave 256 to synchronize the first carrier wave 256 to the second carrier wave of the second NFC device.

The PLL 210 can operate in an open loop mode of operation or in a closed loop mode of operation. In the closed loop mode of operation, the PLL 210 performs frequency multiplication and/or division, via a negative feedback mechanism, to generate the first carrier wave 256 in terms of a reference signal provided by a crystal oscillator. The PLL 210 adjusts a voltage to frequency converter, such as a voltage controlled oscillator (VCO) to provide an example, such that the frequency and/or the phase of the first carrier wave 256 is approximately equal to a frequency and/or phase of the reference signal. The PLL 210 adjusts the frequency and/or the phase of the first carrier wave 256 by based upon a difference between frequencies and/or phases of the first carrier wave 256 and the reference signal. In an exemplary embodiment, the voltage to frequency converter can include a variable capacitance that forms part of a tuned resonant circuit. In this exemplary embodiment, a capacitance of the variable capacitance can be adjusted by the error control signal 266 to adjust the frequency and/or the phase of the first carrier wave 256. In some situations, the frequency of the first carrier wave 256 is an integer or fractional multiple of the frequency of the reference signal. In these situations, the PLL 210 can include a programmable integer or fractional dividing circuit to divide the frequency of the first carrier wave 256 to approximate the frequency of the reference signal. In another exemplary embodiment, this programmable integer or fractional dividing circuit can be further adjusted by the error control signal 266 to adjust the frequency and/or the phase of the first carrier wave 256.

Otherwise, in the open loop mode of operation, the PLL 210 drives the voltage to frequency converter to provide the first carrier wave 256 without the reference signal provided by a crystal oscillator. This situation can arise when the crystal oscillator is not available. For example, the first NFC device 200 can be incorporated within or coupled to the other electrical device or the host device. In this example, the other electrical device or the host device can include the crystal oscillator and a power source, such as a battery to provide an example, for supplying power to the crystal oscillator. Also, in this example, the crystal oscillator is not available when the power source does not have sufficient energy to power the crystal oscillator. In the open loop mode of operation, the PLL 210 adjusts the frequency and/or the phase of the first carrier wave 256 using the error control signal 266. From the exemplary embodiment above, the capacitance of the variable capacitance can be adjusted by error control signal 266 to adjust the frequency and/or the phase of the first carrier wave 256 in the open loop mode of operation.

Exemplary Isolation Module

Figure 3:
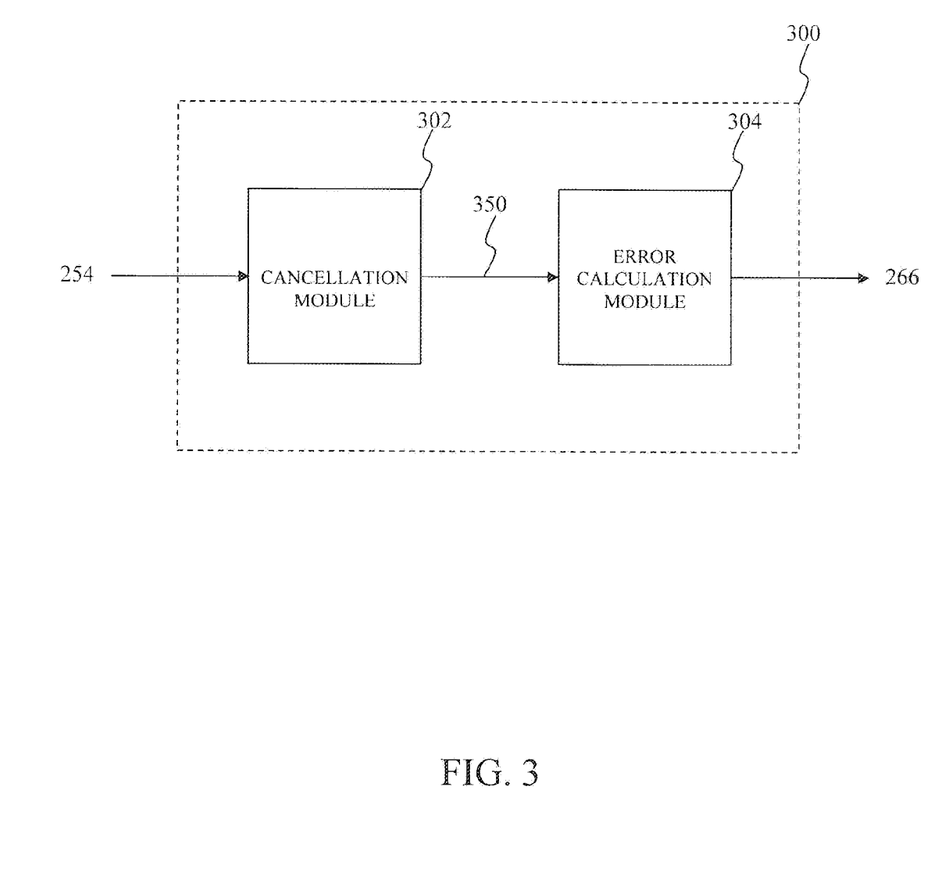
FIG. 3 illustrates a block diagram of an exemplary isolation module that forms part of the controller within the NFC device according to an exemplary embodiment of the disclosure.

FIG. 3 illustrates a block diagram of an exemplary isolation module that forms part of the controller within the NFC device according to an exemplary embodiment of the disclosure. An isolation module 300 determines the error control signal 266 based upon the recovered sequence of information 254 to synchronize a first carrier wave, such as the first carrier wave of the first NFC device 102 or the first carrier wave 256 to provide some examples, to a second carrier wave, such as the second carrier wave of the second NFC device 104 to provide an example. The isolation module 300 includes a cancellation module 302 and an error calculation module 304. The isolation module 300 can be implemented as part of the controller 202.

The cancellation module 302 detects the one or more integration windows using a pattern matching procedure. This pattern matching procedure matches bits within the recovered sequence of information 254 to each other to detect one or more sequences of bits from among the recovered sequence of information 254 that when integrated over effectively cancels the transmission information 252 from the recovered sequence of information 254. The one or more integration windows represent a duration in time of the recovered sequence of information 254 having an approximate equal number of logical ones and logical zeros, for example an approximate equal number of positive logical values and negative logical values when using the bipolar modulation scheme. The recovered sequence of information 254 has a substantially fixed common mode component, such as approximately zero to provide an example, over the one or more integration windows. This substantially fixed common mode component allows the transmission information 252 to be cancelled from the recovered sequence of information 254 by integrating the recovered sequence of information 254 over the one or more integration windows leaving the information modulated onto the second carrier wave of the second NFC device.

The cancellation module 302 integrates the recovered sequence of information 254 over the one or more integration windows to cancel out the information corresponding to the first NFC device to provide the isolated sequence of information 350 of the second NFC device. The recovered sequence of information 254 has a substantially fixed common mode component, such as approximately zero to provide an example, over the one or more integration windows. As such, when the cancellation module 302 integrates the recovered sequence of information 254 over the one or more integration windows, the information corresponding to the first NFC device integrates to approximately zero and the information corresponding to the second NFC device can be isolated within the recovered sequence of information 254 because of the difference in frequencies and/or phases between the first carrier wave and the second carrier wave. The cancellation module 302 provides the integrated information corresponding to the second NFC device to the error calculation module 304 as the isolated sequence of information 350 of the second NFC device.

The error calculation module 304 measures one or more characteristics, such as a phase and/or a frequency, of the isolated sequence of information 350 of the second NFC device to determine the error control signal 266 representing a frequency error between the frequency of the first carrier wave and the frequency of the second carrier wave and/or a phase error between the phase of the first carrier wave and the phase of the second carrier wave. In an exemplary embodiment, the error calculation module 304 measures a polarity and/or a magnitude of a phase of the isolated sequence of information 350 of the second NFC device. In this exemplary embodiment, the error calculation module 304 can include a coordinate rotation digital computer (CORDIC) to convert the isolated sequence of information 350 of the second NFC device to a polar representation having a magnitude and a phase. The error calculation module 304 compares the one or more characteristics of the isolated sequence of information 350 of the second NFC device with one or more characteristics of the first carrier wave to determine the error control signal 266.

Exemplary One or More Integration Windows

Figure 4:
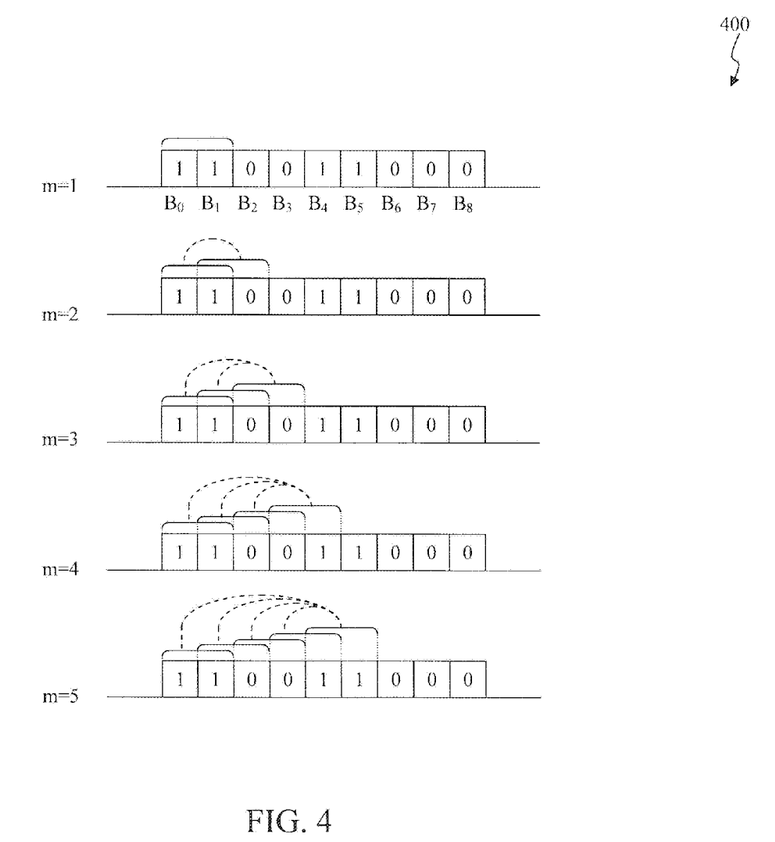
FIG. 4 is a flowchart of exemplary operational steps of a pattern matching procedure to determine one or more integration windows according to an exemplary embodiment of the present disclosure.

FIG. 4 is a flowchart of exemplary operational steps of a pattern matching procedure to detect one or more integration windows according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 to detect the one or more integration windows for integrating a recovered sequence of information, such as the recovered sequence of information 254 to provide an example. The exemplary operational control flow 400 can be implemented by the first NFC device 102, the second NFC device 104, the controller 202, and/or the cancellation module 302 to provide some examples to detect the one or more integration windows.

The exemplary operational control flow 400 detects the one or more integration windows through an iterative sequence of steps, such as m=1 through m=5 as illustrated in FIG. 4 to provide an example. At a first step (m=1) of the iterative sequence of steps, the operational control flow 400 selects a target group of bits from among the recovered sequence of information. In an exemplary embodiment, the number of bits from among the recovered sequence of information that are selected as target group of bits can be programmable and/or can be related to the duration of an impulse response of an equivalent filter with the transmission information 252 as its input and the recovered sequence of information 254 as its output. At the first step (m=1), bits $B_0$ and $B_1$, namely, logical one and logical one, from among the recovered sequence of information are considered as the target group of bits from a previous iterative sequence of the pattern matching procedure.

At a second step (m=2) of the iterative sequence of steps, the operational control flow 400 selects bits $B_1$ and $B_2$ namely, logical one and logical zero, from among the recovered sequence of information as the target group of bits. Thereafter, the operational control flow 400 selects a match group of bits, namely, bits $B_0$ and $B_1$, from among the recovered sequence of information. In an exemplary embodiment, the operational control flow 400 selects the match group of bits as a group of bits that is one bit before the target group of bits with the same number of bits. Next, the operational control flow 400 compares the target group of bits to the match group of bits. Because the target group of bits, namely logical one and logical zero, selected at the second step (m=2) does not match the match group of bits, namely logical one and logical one, selected at the second step (m=2), the operational control flow 400 proceeds to a third step (m=3) of the iterative sequence of steps.

At the third step (m=3) of the iterative sequence of steps, the operational control flow 400 selects bits $B_2$ and $B_3$ namely, logical zero and logical zero, from among the recovered sequence of information as the target group of bits. Thereafter, the operational control flow 400 selects a first match group of bits, namely, bits $B_1$ and $B_2$, from among the recovered sequence of information. Next, the operational control flow 400 compares the target group of bits to the first match group of bits. Because the target group of bits, namely logical zero and logical zero, selected at the third step (m=3) does not match the first match group of bits, namely logical one and logical zero, selected at the third step (m=3), the operational control flow 400 proceeds to select a second match group of bits, namely, bits $B_0$ and $B_1$, from among the recovered sequence of information. Because the target group of bits, namely logical zero and logical zero, selected at the third step (m=3) does not match the second match group of bits, namely logical one and logical one, selected at the third step (m=3), the operational control flow 400 proceeds to a fourth step (m=4) of the iterative sequence of steps.

At the fourth step (m=4) of the iterative sequence of steps, the operational control flow 400 selects bits $B_3$ and $B_4$ namely, logical zero and logical one, from among the recovered sequence of information as the target group of bits. Thereafter, the operational control flow 400 selects a first match group of bits, namely, bits $B_2$ and $B_3$, from among the recovered sequence of information. Next, the operational control flow 400 compares the target group of bits to the first match group of bits. Because the target group of bits, namely logical zero and logical one, selected at the fourth step (m=4) does not match the first match group of bits, namely logical zero and logical zero, selected at the fourth step (m=4), the operational control flow 400 proceeds to select a second match group of bits, namely, bits $B_1$ and $B_2$, from among the recovered sequence of information. Because the target group of bits, namely logical zero and logical one, selected at the fourth step (m=4) does not match the second match group of bits, namely logical one and logical zero, selected at the fourth step (m=4), the operational control flow 400 proceeds to a select a third match group of bits, namely, bits $B_0$ and $B_1$, from among the recovered sequence of information. Because the target group of bits, namely logical zero and logical one, selected at the fourth step (m=4) does not match the third match group of bits, namely logical one and logical one, selected at the fourth step (m=4), the operational control flow 400 proceeds to a fifth step (m=5) of the iterative sequence of steps.

At the fifth step (m=5) of the iterative sequence of steps, the operational control flow 400 selects bits $B_4$ and $B_5$ namely, logical one and logical one, from among the recovered sequence of information as the target group of bits. Thereafter, the operational control flow 400 selects a first match group of bits, namely, bits $B_3$ and $B_4$, from among the recovered sequence of information. Next, the operational control flow 400 compares the target group of bits to the first match group of bits. Because the target group of bits, namely logical one and logical one, selected at the fifth step (m=5) does not match the first match group of bits, namely logical zero and logical zero, selected at the fifth step (m=5), the operational control flow 400 proceeds to select a second match group of bits, namely, bits $B_2$ and $B_3$, from among the recovered sequence of information. Because the target group of bits, namely logical one and logical one, selected at the fifth step (m=5) does not match the first match group of bits, namely logical zero and logical zero, selected at the fifth step (m=5), the operational control flow 400 proceeds to select a third match group of bits, namely, bits $B_1$ and $B_2$, from among the recovered sequence of information. Because the target group of bits, namely logical one and logical one, selected at the fifth step (m=5) does not match the third match group of bits, namely logical one and logical zero, selected at the fifth step (m=5), the operational control flow 400 proceeds to a select a fourth match group of bits, namely, bits $B_0$ and $B_1$, from among the recovered sequence of information.

Because the target group of bits, namely logical one and logical one, selected at the fifth step (m=5) matches the fourth match group of bits, namely logical one and logical one, selected at the fifth step (m=5), the operational control flow 400 declares that the target group of bits is detected and detects the one or more integration windows over which the recovered sequence of information is to be integrated. The one or more integration window starts from bit $B_2$ as the bit after bits $B_0$ and $B_1$ of the fourth match group and ends at bit $B_5$ as the last bit of the bits $B_4$ and $B_5$ of the detected target group of bits.

In an exemplary embodiment, the operational control flow 400 represents an iterative process. For each complete iteration, such as the first step (m=1) through the fifth step (m=5) as discussed above in FIG. 4, the operational control flow 400 detects an integration window from among the one or more integration windows over which the recovered sequence of information is to be integrated; however, those skilled in the relevant art(s) will recognize that each complete iteration need not have the same number of steps. In this exemplary embodiment, the operational control flow 400 restarts the iterative process after detecting the integration window to detect another integration window from among the one or more integration windows over which the recovered sequence of information is to be integrated. For example, the bits $B_4$ and $B_5$ are selected as the target group of bits from the previous iterative sequence and the operational control flow 400 begins at first step (m=1) to detect the other integration window.

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A first near field communication (NFC) device, comprising:
   a modulator configured to modulate first information onto a first carrier wave in accordance with a bipolar modulation scheme;
   a demodulator configured to demodulate a recovered communication signal in accordance with the bipolar modulation scheme to provide a recovered sequence of bits, the recovered communication signal including the first information modulated onto the first carrier wave and second information modulated onto a second carrier wave by a second NFC device; and
   a controller configured to:
      determine an integration window using a pattern matching procedure,
      integrate the recovered sequence of bits over the integration window to isolate the second information from the recovered sequence of bits,
      measure a characteristic of the isolated second information to determine an error between the first carrier wave and the second carrier wave, and
      cause the first carrier wave to be adjusted in accordance with the error to substantially synchronize the first carrier wave and the second carrier wave.

2. The first NFC device of claim 1, wherein the pattern matching procedure is configured to match one or more bits of the recovered sequence of bits to each other to detect a sequence of bits from among the recovered sequence of bits that when integrated over the integration window effectively isolates the second information from the recovered sequence of bits.

3. The first NFC device of claim 2, wherein the pattern matching procedure is further configured to:
   select a target group of bits from among the one or more bits of the recovered sequence of bits, and
   iteratively compare the target group of bits to one or more match groups of bits from among the recovered sequence of bits until the target group of bits matches one of the one or more match groups of bits.

4. The first NFC device of claim 3, wherein the pattern matching procedure is further configured to:
   detect the integration window as being from one or more bits adjacent to the one of the one or more match groups of bits that matches the target group of bits to one or more bits of the target group of bits.

5. The first NFC device of claim 3, wherein the pattern matching procedure is further configured to:

select a second target group of bits, different from the first target group of bits, from among the one or more bits of the recovered sequence of bits when the target group of bits does not match the one or more match groups of bits, and iteratively compare the second target group of bits to one or more second match groups of bits from among the recovered sequence of bits until the second target group of bits matches one of the one or more second match groups of bits.

6. The first NFC device of claim 1, wherein the controller is configured to measure the characteristic of the isolated second information to determine a frequency error between a frequency of the first carrier wave and a frequency of the second carrier wave or a phase error between a phase of the first carrier wave and a phase of the second carrier wave.

7. The first NFC device of claim 6, further comprising:
a phase locked loop configured to:
provide the first carrier wave, and
adjust the frequency of the first carrier wave based on the frequency error or the phase of the first carrier wave based on the phase error.

8. A controller for a first near field communication (NFC) device, the controller comprising:
a cancellation module configured to:
detect an integration window by matching one or more bits of a recovered sequence of bits to each other, the recovered sequence of bits including first information corresponding to the first NFC device and second information corresponding to a second NFC device, and
isolate the second information from the recovered sequence of bits over the integration window; and
an error calculation module configured to:
measure a characteristic of the isolated second information to determine an error between a first carrier wave of the first NFC device and a second carrier wave of the second NFC device, and
cause the first carrier wave to be adjusted in accordance with the error to substantially synchronize the first carrier wave and the second carrier wave.

9. The controller of claim 8, wherein the cancellation module is configured to detect the integration window using a pattern matching procedure.

10. The controller of claim 9, wherein the pattern matching procedure is configured to:
select a target group of bits from among the one or more bits of the recovered sequence of bits, and
iteratively compare the target group of bits to one or more match groups of bits from among the recovered sequence of bits until the target group of bits matches one of the one or more match groups of bits.

11. The controller of claim 10, wherein the pattern matching procedure is further configured to:
detect the integration window as being from one or more bits adjacent to the one of the one or more match groups of bits that matches the target group of bits to one or more bits of the target group of bits.

12. The controller of claim 10, wherein the pattern matching procedure is further configured to:
select a second target group of bits, different from the first target group of bits, from among the one or more bits of the recovered sequence of bits when the target group of bits does not match the one or more match groups of bits, and
iteratively compare the second target group of bits to one or more second match groups of bits from among the recovered sequence of bits until the second target group of bits matches one of the one or more second match groups of bits.

13. The controller of claim 8, wherein the error calculation module is configured to measure the characteristic of the isolated second information to determine a frequency error between a frequency of the first carrier wave and a frequency of the second carrier wave or a phase error between a phase of the first carrier wave and a phase of the second carrier wave.

14. The controller of claim 8, wherein the cancellation module is further configured to integrate the recovered sequence of bits over the integration window to isolate the second information from the recovered sequence of bits.

15. A method for synchronizing a first near field communication (NFC) device and a second NFC device, the method comprising:
detecting, by the first NFC device, an integration window by matching one or more bits of a recovered sequence of bits to each other, the recovered sequence of bits including first information corresponding to the first NFC device and second information corresponding to the second NFC device;
isolating, by the first NFC device, the second information from the recovered sequence of bits by integrating the recovered sequence of bits over the integration window;
measuring, by the first NFC device, a characteristic of the isolated second information to determine an error between a first carrier wave of the first NFC device and a second carrier wave of the second NFC device; and
causing the first carrier wave to be adjusted in accordance with the error to substantially synchronize the first carrier wave and the second carrier wave.

16. The method of claim 15, wherein the detecting comprises detecting the integration window using a pattern matching procedure, the pattern matching procedure comprising:
selecting a target group of bits from among the one or more bits of the recovered sequence of bits, and
iteratively comparing the target group of bits to one or more match groups of bits from among the recovered sequence of bits until the target group of bits matches one of the one or more match groups of bits.

17. The method of claim 16, wherein the pattern matching procedure further comprises:
detecting the integration window as being from one or more bits adjacent to the one of the one or more match groups of bits that matches the target group of bits to one or more bits of the target group of bits.

18. The method of claim 16, wherein the pattern matching procedure further comprises:
selecting a second target group of bits, different from the first target group of bits, from among the one or more bits of the recovered sequence of bits when the target group of bits does not match the target group of bits, and
iteratively comparing the second target group of bits to one or more second match groups of bits from among the recovered sequence of bits until the second target group of bits matches one of the one or more second match groups of bits.

19. The method of claim 16, wherein the measuring comprises:
measuring the characteristic of the isolated second information to determine a frequency error between a frequency of the first carrier wave and a frequency of the second carrier wave or a phase error between a phase of the first carrier wave and a phase of the second carrier wave.

* * * * *